United States Patent [19]

Kunna et al.

[11] Patent Number: 4,768,264

[45] Date of Patent: Sep. 6, 1988

[54] WAX PAPER CLAMP FOR POTS

[76] Inventors: Paul E. Kunna; Sadie A. Kunna, both of 11145 Normandy Cir., Apartment 3, Temple Terrace, Fla. 33617

[21] Appl. No.: 99,979

[22] Filed: Sep. 23, 1987

[51] Int. Cl.⁴ ............................................. A44B 21/00
[52] U.S. Cl. ....................................... 24/522; 24/523
[58] Field of Search ............. 24/522, 523, 526, 129 A, 24/129 B; 269/88, 166; 248/216.1, 216.4; 211/43

[56] References Cited

U.S. PATENT DOCUMENTS

| 1,266,776 | 5/1918 | Dietzel | 24/523 |
| 1,750,576 | 3/1930 | Cubberley | 211/43 |
| 2,399,339 | 4/1946 | Foster | 24/522 |
| 2,508,076 | 5/1950 | Palmer | 24/523 |
| 2,779,984 | 2/1957 | Bourgeois | 24/459 |
| 2,917,263 | 12/1959 | Appleton et al. | 248/216 |
| 3,218,058 | 11/1965 | Smith | 269/166 |
| 3,245,677 | 4/1966 | Hurd et al. | 269/254 |
| 4,088,313 | 5/1978 | Pearson | 269/88 |
| 4,106,735 | 8/1978 | Partain et al. | 211/43 |
| 4,340,996 | 7/1982 | Starace | 24/459 |
| 4,646,452 | 3/1987 | Mazzucchelli | 24/522 |

Primary Examiner—Victor N. Sakran
Attorney, Agent, or Firm—Henderson & Sturm

[57] ABSTRACT

A clamp apparatus (10) for use in combination with a flexible sheet (30) of material (31) to cover a cooking receptacle (40) to prevent the splattering of foodstuffs in the interior cavity of a microwave oven (20), wherein the clamp apparatus (10) comprises in general a male clamp member (11) and a female clamp member (12); wherein the male and female clamp members cooperate to vary the effective length of the clamp apparatus (10).

2 Claims, 1 Drawing Sheet

WAX PAPER CLAMP FOR POTS

TECHNICAL FIELD

The present invention relates generally to accessory items used in microwave cooking and more specifically to clamp means used to restrain a cover element relative to a food receptacle.

BACKGROUND OF THE INVENTION

The present invention was the subject matter of DDP registration number 164098 which was filed in the U.S. Patent and Trademark Office Feb. 13, 1987.

As can be seen by reference to the following U.S. Pat. Nos.: 4,088,313; 3,218,058; 3,245,677 and 2,917,263 the prior art is replete with myriad and diverse clamp constructions which are designed and intended to engage and restrain one structural element relative to another.

While all of the aforementioned prior art constructions are more than adequate for the particular purpose and function; for which they were specifically designed, these patented devices are fairly well restricted for use in the intended environments, and they are not readily interchangeable with one another, nor adapted or particularly suited for use in other disparate environments.

As was the case with the introduction of other new technologies, the advent of the microwave oven while heralded as a time and labor saving device, was also accompanied by a new set of problems for the consumer attendant upon the unique mode of operation of the microwave oven; and, the particular requirements imposed upon the user due to the characteristics of microwave energy.

Some of the more noticeable differences between cooking in a microwave oven as opposed to a conventional oven involves the fact that metal receptacles cannot be used in a microwave oven; and, that the vast majority of foodstuffs that can easily be cooked in an uncovered pot or pan in a conventional oven or on a conventional stove must now be placed in a covered or sealed plastic or glass container to prevent the splattering of foodstuffs on the interior surface of the microwave oven.

In instances wherein the consumer does not have a cover or lid for the receptacle that contains the foodstuffs, it is a common practice for an individual to place wax paper over the receptacle opening during the cooking process. Unfortunately, even in microwave ovens having a stationary support surface, the sheet of wax paper frequently becomes dislodged from the receptacle due to air currents within the oven proper and/or the impingement of the splattering foodstuffs contained within the receptacle. Needless to say, in instances wherein the microwave oven is provided with a rotary carousel, the centrifugal forces imparted to the sheet of wax paper further exacerbate this situation to the point wherein it is virtually impossible for the wax paper to maintain a covering relationship relative to the receptacle.

Based on the foregoing facts there has existed a long standing and as yet unsatisfied need for a clamping device that can be used to engage and restrain a sheet of wax paper relative to a receptacle while the receptacle is contained within a microwave oven.

BRIEF SUMMARY OF THE INVENTION

The present invention involves in general a wax paper clamp for cooking receptacles. The clamp apparatus that forms the basis of this invention comprises a two piece clamping device, including a male clamping member and a female member that cooperate in a mating engagement to frictionally engage a sheet of wax paper against the exterior surface of a cooking receptacle.

In addition, the male and female clamping members are dimensioned and configured to telescopically extend across the openings of cooking receptacles having a wide range of dimensions and configurations, wherein the two piece clamping device will engage the wax paper against the top and sides of either the longest or shortest opposed exterior surfaces of the diverse cooking surfaces.

Furthermore, each of the clamping members are provided with a generally T-shaped configuration wherein the arms of the clamp members comprise a clamp segment and a handle segment; and, wherein the elongated legs of the clamp members cooperate with one another in a mating engagement to telescopically vary the effective width of the clamp apparatus.

BRIEF DESCRIPTION OF THE DRAWINGS

These and other objects, advantages, and novel features of the invention will become apparent from the detailed description of the best mode for carrying out the preferred embodiment of this invention which follows, particularly when considered in conjunction with the accompanying drawings; wherein.

BEST MODE FOR CARRYING OUT THE INVENTION

Figure 1:
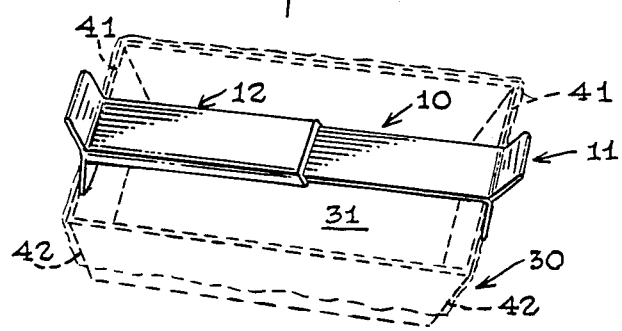
FIG. 1 is a perspective view of the clamp apparatus of this invention deployed in its intended environment.

As can be seen by reference to the drawings and in particular to FIG. 1, the clamp apparatus that forms the basis of the present invention is designated generally by the reference numeral (10); and, is intended for use in a microwave oven (20) for the purpose of clamping a flexible sheet (30) of microwave impervious and transmissive material (31) such as wax paper or the like to the external surfaces of a cooking receptacle (40). In addition, the clamp apparatus (10) comprises in general a male clamp member (11) and a female clamp member (12).

Figure 2:
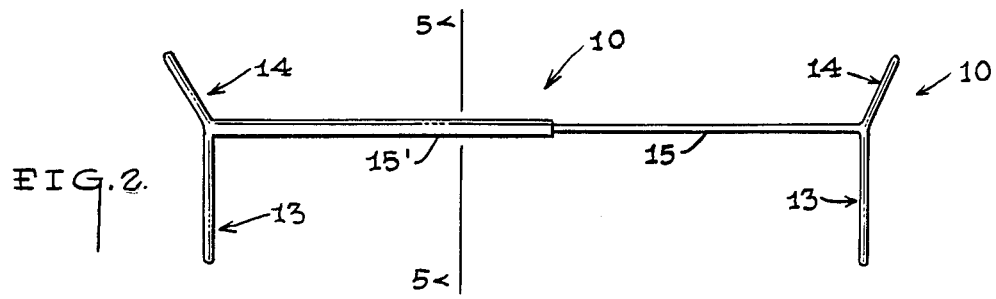
FIG. 2 is a side elevation view of the apparatus.

Turning now to FIG. 2, it can be seen that both the male (11) and female (12) clamp members are provided with a generally T-shaped configuration; wherein, the arms of the clamp members (11) and (12) comprise a clamp segment (13) and a handle segment (14) and wherein the elongated legs of the clamp members (11) and (12) comprise generally elongated rectangular mating segments (15)(15′).

As shown in FIGS. 1 thru 5, the male and female clamp members (11) and (12) have a generally wide flat profile, yet the clamp apparatus has a relative slim profile when viewed from the side. In addition, the male and female clamp members (11)(12) are fabricated from a relatively rigid microwave transmissive material (16) such as ceramic, glass, lucite or the like; wherein, the weight of the clamp apparatus (10) enhances the frictional engagement of the sheet (30) of material intermediate the clamp apparatus (10) and the top surface (41) of a cooking receptacle (40).

As depicted in the drawings, all of the segments (13)(14)(15)(15') of the clamp apparatus (10) have a generally elongated flat rectangular configuration; wherein, in their operative disposition the mating segments (15)(15') are disposed in a horizontal orientation; the clamp segments (13) are disposed in a downwardly depending generally vertical orientation; and, the handle segments (14) are disposed in an upwardly and outwardly angled orientation as is best depicted in FIG. 2.

Figure 3:
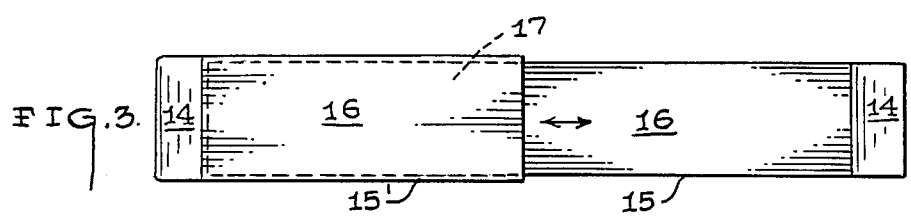
FIG. 3 is a top plan view of the apparatus.
Figure 4:
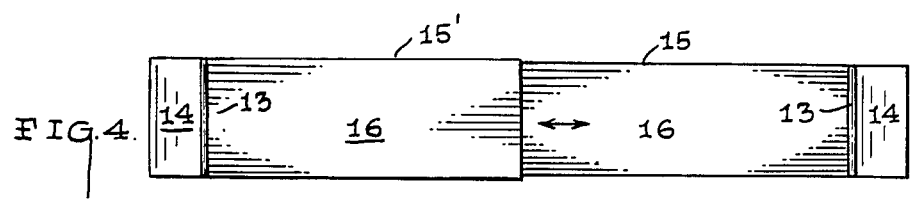
FIG. 4 is a bottom plan view of the apparatus.
Figure 5:
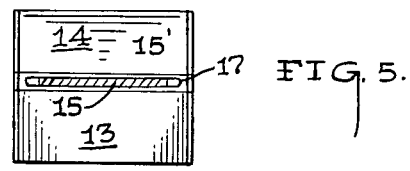
FIG. 5 is a cross-sectional view of the apparatus taken thru line 5—5 of FIG. 2.

As can best be seen by reference to FIGS. 3 and 5, the mating segment (15') of the female clamp member (12) is provided with an elongated generally flat rectangular recess (17) that is dimensioned to slidingly receive the mating segment (15) of the male clamp member (11); such that the male and female members (11) and (12) may be extended and retracted relative to one another to vary the effective length of the clamp apparatus (10).

At this juncture it should be appreciated that the clamp apparatus (10) of this invention may be selectively extended; such that the mating segments (15)(15') will frictionally engage a flexible sheet (30) of wax paper or the like against the top surface (41) of a cooking receptacle (40); while the clamp segments (13) will frictionally engage the sheet against a portion of the sides (42) of the cooking receptacle (40). As a consequence, the flexible sheet (30) will function as a cover for the cooking receptacle (40) to prevent any food splattering from coming into contact with the interior cavity of the microwave oven (20).

Having thereby described the subject matter of this invention, it should be obvious that many substitutions, modifications, and variations thereof are possible in light of the above teachings. It is therefore to be understood that the invention as taught and described herein is only to be limited to the extent of the breadth and scope of the appended claims.

We claim:

1. A clamp apparatus in combination with a cooking receptacle and a flexible sheet of microwave transmissive material to prevent food splatters from escaping from the interior of the cooking receptacle; wherein, the clamp apparatus consists of:

a male clamp member and a female clamp member fabricated from microwave transmissive material; wherein, the male and female members are provided with: generally rectangular horizontally disposed mating segments that are adapted to vary the effective length of the clamp apparatus; generally rectangular vertically disposed clamp segments which depend downwardly from the ends of the horizontally disposed mating segments; and, generally rectangular vertically disposed handle segments which project upwardly from the ends of the horizontally disposed mating segments; wherein, the female mating segment is provided with an elongated generally flat rectangular recess that is dimensioned to receive the male mating segment; and wherein the clamp segments are adapted to engage the said sheet of microwave transmissive material against the sides of the cooking apparatus.

2. The clamp apparatus as in claim 1 wherein the vertically disposed handle segments are angled outwardly relative to the ends of the horizontally disposed mating segments.

* * * * *